US009374820B2

United States Patent
Schliwa-Bertling et al.

(10) Patent No.: US 9,374,820 B2
(45) Date of Patent: Jun. 21, 2016

(54) DYNAMIC TEMPORARY BLOCK FLOW SCHEDULING

(75) Inventors: Paul Schliwa-Bertling, Ljungsbro (SE); Håkan Axelsson, Linköping (SE); Pär Gustavsson, Linköping (SE); Anders Holm, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 77 days.

(21) Appl. No.: 14/360,160

(22) PCT Filed: Nov. 22, 2011

(86) PCT No.: PCT/SE2011/051401
§ 371 (c)(1),
(2), (4) Date: May 22, 2014

(87) PCT Pub. No.: WO2013/077785
PCT Pub. Date: May 30, 2013

(65) Prior Publication Data
US 2015/0173071 A1 Jun. 18, 2015

(51) Int. Cl.
*H04W 4/00* (2009.01)
*H04W 72/04* (2009.01)
*H04W 72/12* (2009.01)

(52) U.S. Cl.
CPC ........ *H04W 72/0446* (2013.01); *H04W 72/042* (2013.01); *H04W 72/1263* (2013.01)

(58) Field of Classification Search
CPC ................................................ H04W 72/0446
USPC .................................. 370/328–339; 455/466
See application file for complete search history.

(56) References Cited

U.S. PATENT DOCUMENTS

| 2007/0183387 A1 | 8/2007 | Pecen et al. |
| 2011/0069669 A1* | 3/2011 | Dwyer .................. H04L 1/1614 370/329 |
| 2011/0200019 A1* | 8/2011 | Manbo ................ H04W 72/048 370/336 |
| 2015/0173071 A1* | 6/2015 | Schliwa-Bertling H04W 72/1263 370/336 |

FOREIGN PATENT DOCUMENTS

| WO | 02093968 A1 | 11/2002 |
| WO | 2006125149 A2 | 11/2006 |

* cited by examiner

*Primary Examiner* — Iqbal Zaidi
(74) *Attorney, Agent, or Firm* — Rothwell, Figg, Ernst & Manbeck, P.C.

(57) ABSTRACT

Scheduling of a Temporary Block Flow in a wireless communication system, wherein a type of Temporary Block Flow supported in the wireless communication system is evaluated (310) and a set of packet data channels pre-assigned to the Temporary Block Flow is identified. For a type of Temporary Block Flow supporting dynamic scheduling, carrier scheduling is performed by identifying timeslots (320) available for packet data scheduling for the Transmission Time Interval, determining a new set of packet data channels for potential scheduling to the Temporary Block Flow in the Transmission Time Interval, wherein the new set of packet data channels may include time slots on any carrier(s), and specifying (330) the packet data channels selected for potential scheduling for the Temporary Block Flow as a subset of packet data channels within the pre-assigned packet data channels. Packet data channels are allocated (340) for the Temporary Block Flow in the Transmission Time Interval. The Temporary Block Flow is scheduled (350) to the set of packet data channels.

13 Claims, 4 Drawing Sheets

| | TN | | | | | | | | |
|---|---|---|---|---|---|---|---|---|---|
| | | | | | | | | | B=BCCH |
| | | | | | | | | | S=SDCCH |
| | | | | | | | | | T=TCH |
| | | | | | | | | | P=PDCH |
| Carrier | 0 | 1 | 2 | 3 | 4 | 5 | 6 | 7 | |
| C1 | B | S | S | T | T | T | T | T | |
| C2 | T | T | T | T | T | T | T | T | |
| C3 | T | T | T | T | P | P | P | P | |
| C4 | T | T | T | T | P | P | P | P | |
| C5 | P | P | P | P | P | P | P | P | |
| C6 | P | P | P | P | P | P | P | P | |

DYNAMIC TEMPORARY BLOCK FLOW SCHEDULING

CROSS REFERENCE TO RELATED APPLICATION(S)

This application is a 35 U.S.C. §371 National Phase Entry Application from PCT/SE2011/051401 filed Nov. 22, 2011, the disclosure of which is incorporated by reference.

TECHNICAL FIELD

The present invention relates to scheduling of a Temporary Block Flow in a wireless communication system.

BACKGROUND

A wireless communication system comprises a network having network nodes providing radio access connections for mobile stations within the geographical area of the system.

A mobile station, also known as a terminal and/or user equipments (UE) communicates with one or several network nodes over an air interface. The term communication includes information exchange relating to speech as well as data.

The implementation of the 3GPP GERAN specifications maps the traffic channels for data, packet data traffic channels (PDTCH), on different frequencies (carriers). A carrier is referred to as one frequency if no frequency hopping is used, or a number of frequencies in a hopping frequency set when frequency hopping is used. There are eight time slots on each carrier.

According to 3GPP GERAN a mobile station in a packet transfer mode is assigned to one carrier or two and a single time slot or multiple time slots. The packet switched traffic can be conducted using the single time slot or the multiple time slots over either one carrier (Single Carrier Mode) or two carriers (Dual Carrier Mode). A scheduler located in the network decides (schedules) which Temporary Block Flow (TBF) will get the bandwidth, transmission opportunity, during a given period in time, a Transmission Time Interval (TTI).

A conventional scheduler is restricted, for each Temporary Block Flow (TBF), to the assigned packet data channels (timeslots and carrier(s)). The assigned carrier(s) is static per assigned configuration, which means that a Temporary Block Flow (TBF) re-configuration is needed in order to change carrier(s). In present 3GPP GERAN implementations, such Temporary Block Flow re-configuration takes at least one radio link control round-trip-time to complete. With the present static assignment of Temporary Block Flow, the timeslots, transmitter hardware and radio spectrum are underutilized; thus wasting valuable resources.

SUMMARY

It is an object of the present invention to provide a scheduling method that improves the flexibility for the packet switched scheduler thus enabling a more efficient use of available radio resources. In the context of this document scheduling refers to dynamic allocation of the resources for transfer of the radio blocks in either uplink or downlink direction, i.e. from the network to the mobile station or from the mobile station to the network. The scheduling process is controlled by the network.

This object may be achieved by an embodiment of a method for scheduling a Temporary Block Flow (TBF) in a Transmission Time Interval (TTI). A type of Temporary Block Flow supported in the wireless communication system is evaluated and a set of packet data channels pre-assigned to the Temporary Block Flow is identified. For a type of Temporary Block Flow supporting dynamic scheduling, carrier scheduling is performed by identifying timeslots available for packet data scheduling for the Transmission Time Interval, determining a new set of packet data channels for potential scheduling to the Temporary Block Flow in the Transmission Time Interval, wherein the new set of packet data channels may include time slots on any carrier(s). Packet data channels in the new set of packet data channels are allocated for the Temporary Block Flow in the Transmission Time Interval. The Temporary Block Flow is scheduled to the allocated set of packet data channels.

It is another object of the present invention to improve carrier scheduling between the network node and a mobile station. This object may be achieved by an embodiment of a method in a network node carried out in a Transmission Time Interval. Following a scheduling need for a mobile station, the Temporary Block Flow supported by the mobile station is evaluated and a Temporary Block Flow configuration is determined. Packet data channels for this Temporary Block Flow are assigned based on the Temporary Block Flow configuration and a Temporary Flow Identifier is sent from the network node to the mobile station to provide information to the mobile station on the Temporary Block Flow configuration.

It is a further object of the invention to provide a network node and a mobile station supporting said methods. This object is achieved through a network node and a mobile station as disclosed in the claims.

BRIEF DESCRIPTION OF THE DRAWINGS

FIG. 1 depicts a wireless communication system 100. The purpose of the illustration in FIG. 1 is to provide a general overview of the present methods and the functionalities involved. The present methods and nodes will, as a non-limiting example, be described in a 3GPP GERAN environment.

The wireless communication system 100 comprises a network node 110, and a mobile station 120, arranged to communicate with each other. The mobile station 120 is situated in a cell 130, defined by the network node 110.

The network node 110 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with the mobile station 120 over a wireless interface, depending e.g. of the radio access technology and terminology used. In the rest of the disclosure, the term "network node" will be in order to facilitate the comprehension of the present methods.

The mobile station 120 may be represented by e.g. a wireless communication terminal, a mobile cellular phone, a Personal Digital Assistant (PDA), a wireless platform, a user equipment unit (UE), a portable communication device, a laptop, a computer or any other kind of device configured to communicate wirelessly with the network node 110. The network node 110 controls the radio resource management within the cell 130, such as e.g. allocating radio resources to the mobile station 120 within the cell 130.

Figures 1, 2:
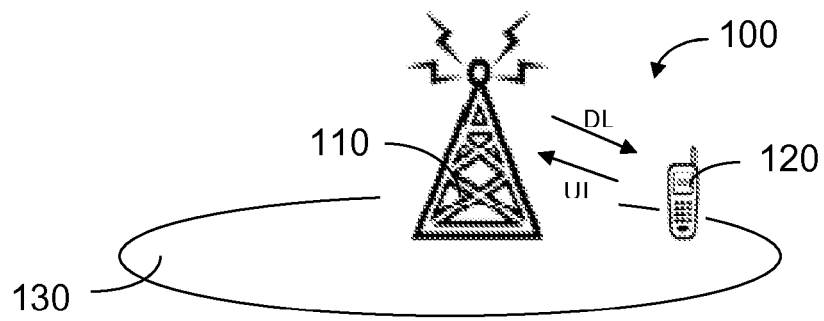
FIG. 1 Is a schematic block diagram illustrating a wireless communication system
FIG. 2 is an illustration of configured timeslots and carriers in 3GPP/GERAN.

FIG. 2 shows an example of configured and allocated timeslots on 6 carriers. Besides the signaling timeslots the timeslots are allocated to CS (TCH) or PS (PDCH). According to 3GPP/GERAN a mobile station in Packet Transfer mode is assigned to one carrier (Single Carrier Mode) or two carriers (Dual Carrier Mode). In the conventional solution for scheduling a Temporary Block Flow (TBF), the PDCHs are under-utilized due to the fact that a TBF can only be assigned timeslots on one or two carriers and the scheduler is restricted to these PDCHs. Furthermore, the TBFs are statically assigned to the timeslots per assigned configuration, which means a timeslot re-configuration is needed in order to change the assigned timeslots.

Figure 3:
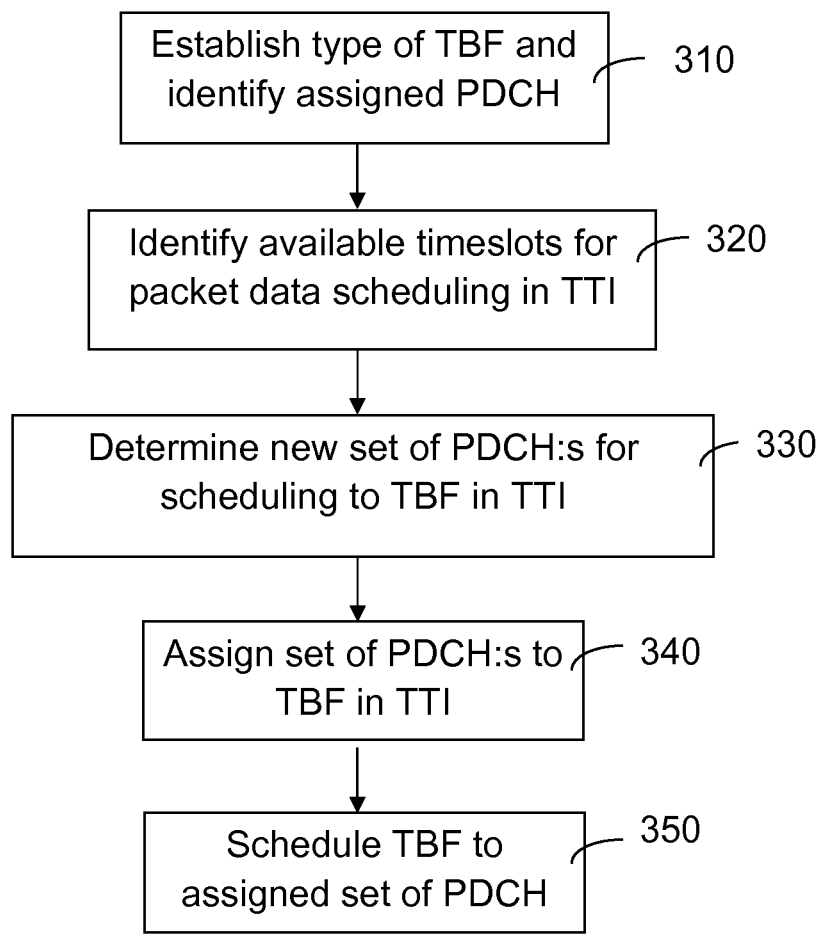
FIG. 3 is a flowchart illustrating an embodiment of a method for scheduling a Temporary Block Flow.

FIG. 3 discloses a flowchart for an embodiment of the method according to the invention, introducing increased flexibility for the packet data scheduler. In accordance with the disclosed embodiment, multiple carriers may be assigned to each TBF to be carried out in a wireless communication system including a plurality of packet channels configured as a time slot on a carrier, as exemplified in FIG. 2.

In a first step 310, the type of Temporary Block Flows (TBF) supported by the mobile stations is evaluated in a Transmission Time Interval. In the following, a mobile station supporting scheduling on the assigned carrier (single or dual) and timeslot(s) will be denoted a legacy MS and a mobile station supporting assignment and scheduling of multiple carriers will be denoted a new MS. The sets of packet data channels pre-assigned to the TBFs are identified.

If there are new MSs that need scheduling, the method includes a step 320 of identifying the timeslots available for packet data scheduling for the Transmission Time Interval.

Timeslots where packet data scheduling can be performed in the next Transmission Time Interval are identified in step 330 for each TBF. A new set of packet data channels for potential scheduling for the Temporary Block Flow in the Transmission Time Interval are determined, wherein the new set of packet data channels includes time slots on any carrier (s) as a subset of the pre-assigned timeslots. This step may be performed by a scheduler in the BSS that decides on what carrier(s) and timeslot(s) to place each TBF. The chosen timeslots are a subset of the packet data channels pre-assigned to the Temporary Block Flow.

In a step following the evaluation of possible carriers to the Temporary Block Flow, packet data channels are assigned for the TBF in the Transmission Time Interval (TTI) in step 340; replacing the set packet data channels earlier assigned to the Temporary Block Flow with the new set of packet data channels. In a carrier scheduling step 350, a scheduler decides per TTI on what carrier(s) and timeslot(s) to place each mobile station, scheduling the TBF to the set of packet data channels. The scheduling may also include selecting a Temporary Flow Identifier TFI (DL and UL) and an Uplink State Flag USF(s) (UL) to each TBF in order to utilize the available TFIs and USFs on the carriers and timeslots. Each mobile station is then informed about this per TTI and is then made ready to receive (DL) or transmit (UL) on the TBF. The mobile station is scheduled on the same carrier during the whole TTI. The scheduling may also include selecting a Temporary Flow Identifier TFI (DL and UL) and an Uplink State Flag USF(s) (UL) to each TBF in order to utilize the available TFIs and USFs on the carriers and timeslots. The actual scheduling may be unaffected by the present invention and may be performed according to conventional scheduling methods.

To inform the new MSs about the new carrier scheduling, a new DL control block may be introduced wherein carrier scheduling information is transmitted to the mobile stations. By including a list of carrier scheduling information, the same control block can address a number of mobile stations.

The control block is preferably sent in such a way that each mobile station is able to receive, given current allocation of carrier and timeslot. The control block may typically be transmitted every TTI, in order to perform carrier scheduling every TTI, but transmission rate may be dynamic depending on need.

A DL control block for a new MS could be using CS-1 or MCS-0 and would thus be as robust as any control blocks for a legacy MS. However depending on current radio conditions, the mobile stations may be unable to successfully receive the control block. The BSS and mobile station will then get "out-of-sync" since BSS believes the mobile station to be "carrier scheduled" on a certain carrier and timeslot and the mobile station is unaware of this.

A fallback method is needed to handle the case when mobile station and BSS get "out-of-sync". Such method could be that the mobile station goes back and listens on "default-carrier" (assigned at TBF assignment) or stays on the old "carrier scheduling".

Figure 4:
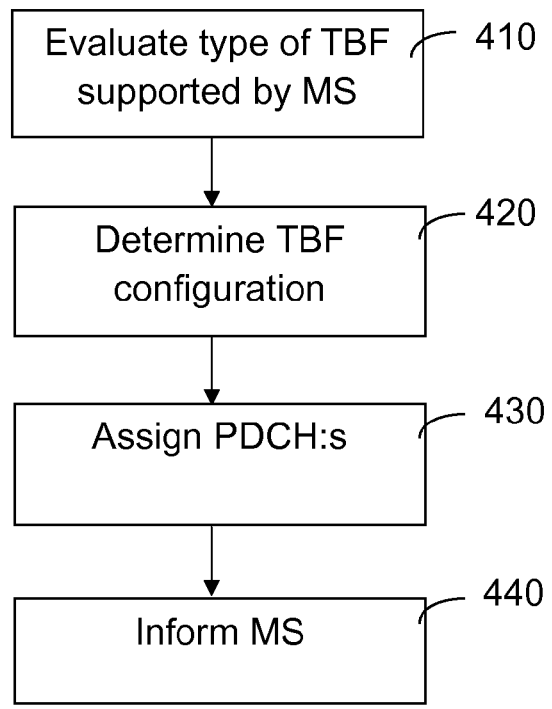
FIG. 4 is a flowchart illustrating an embodiment of a method in a network node for scheduling wireless transmissions.

FIG. 4 is a flowchart illustrating an embodiment of the method in a network node. The method is performed during a Transmission Time Interval TTI. In a first step 410 of the illustrated embodiment, a type of Temporary Block Flow supported by the mobile station is evaluated. This evaluation supports identification of a legacy MS or a new MS as disclosed in relation to FIG. 3. The TBF configuration is determined depending on the type of TBF in step 420, and packet data channels in the TTI are assigned for the TBF based on the TBF configuration in step 430. In a step 440 a Temporary Flow Identifier and USF is sent to the mobile station including information on the TBF configuration.

Packet data channels for assignment to the TBF in the TTI, include time slots on one carrier (single carrier mode) or two carriers (dual carrier mode) on any carrier within a cell.

Figure 5:
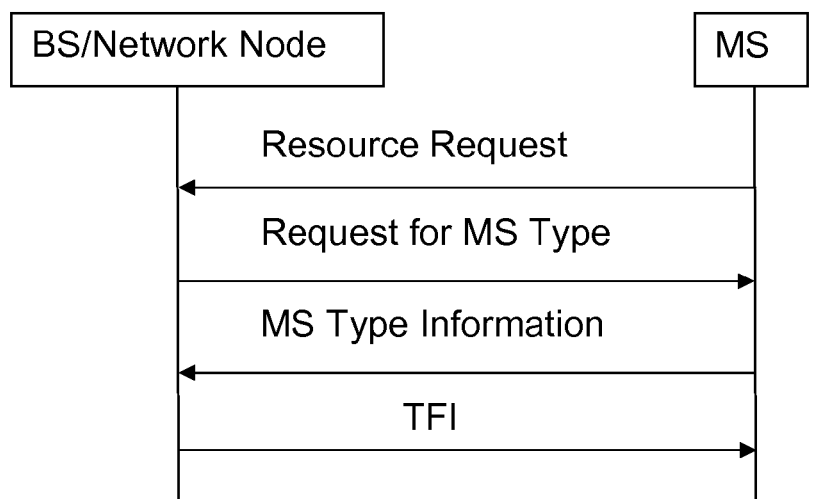
FIG. 5 is a signaling diagram illustrating exchange of signals in accordance with a method in a network node.

FIG. 5 discloses a simplified signaling diagram illustrating the signaling between a network node and a mobile station. The mobile station requests resources for transmission of radio blocks. The network node request information from the mobile station regarding classtype of mobile station, i.e., if the mobile station is configured as a new MS. Carrier scheduling is performed, as disclosed in the discussion related to FIG. 3, wherein carriers and timeslots are decided for each TBF, given that the mobile station is a new MS. Following the carrier scheduling, the new MS is informed on the new carrier scheduling and may act on this information.

Figure 6:
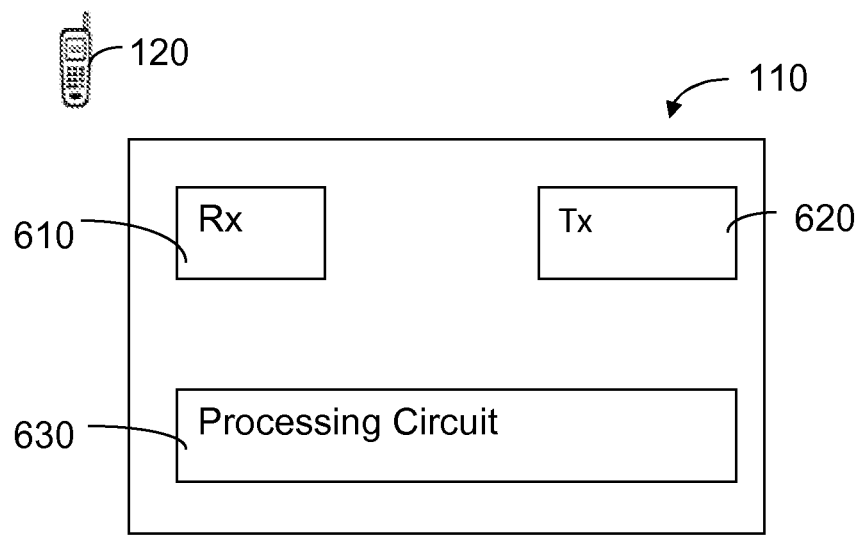
FIG. 6 is a block diagram illustrating an embodiment of a network node.

FIG. 6 is a block diagram illustrating a network node 110. In order to contribute to the methods disclosed in FIGS. 3 and 4, the network node 110 comprises a processing circuit 630. The processing circuit 630 is configured to receive information on type of TBF supported by the MS and to determine Temporary Block Flow configuration. The processing circuit may comprise e.g. one or more instances of a Central Processing Unit (CPU), a processing unit, a processor, a microprocessor, or other processing logic that may interpret and execute instructions. Further, according to some embodiments, the network node 110 may comprise a receiver 610, configured to receive signals from the mobile station 120. In addition, according to some embodiments, the network node 110 comprises a transmitter 620. The transmitter 620 may be arranged to transmit signals to the mobile station 120, such as e.g. informing the new MS of the Temporary Block Flow configuration by transmitting a carrier scheduling decision to the mobile station 120.

Figure 7:
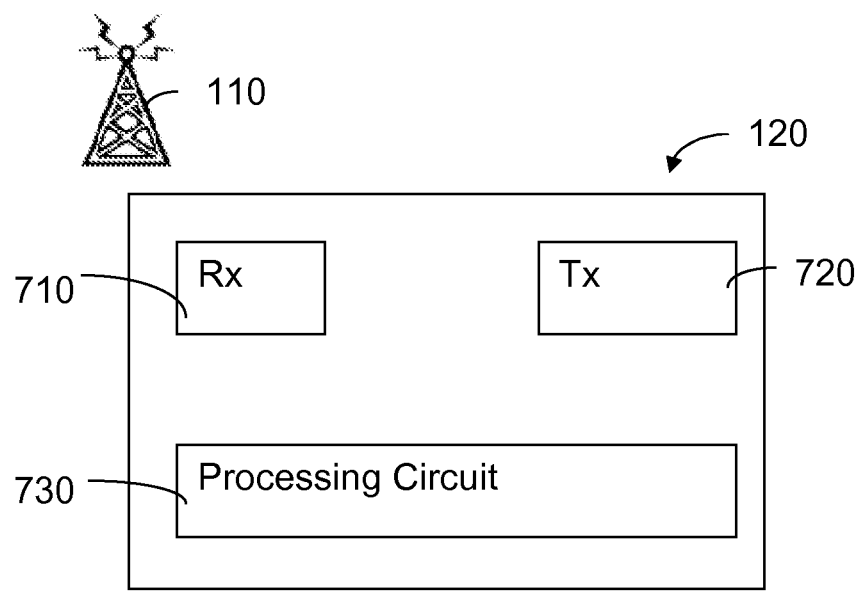
FIG. 7 is a block diagram illustrating an embodiment of a mobile node.

FIG. 7 is a block diagram illustrating a mobile station 120. The mobile station 120 may be represented by e.g. user equipment or the like. The mobile station 120 is configured to contribute to the methods disclosed in FIGS. 3 and 4. The mobile station 120 comprises a receiver 710, a transmitter 720 and a processing circuit 730 including information on type of Temporary Block Flow supported by the mobile station to be transmitted to the network node upon request. The processing circuit 730 is also arranged to receive information on Temporary Block Flow configuration in a control message received from the network node and to act on the received information and tune to the new set of packet data channels. The transmitter 720 is configured for transmitting uplink data in the assigned uplink timeslots, until there are either no more assigned timeslots available, or no more data to transmit. The uplink data is to be received by the network node 110.

The invention claimed is:

1. A method for scheduling a Temporary Block Flow in a Transmission Time Interval in a wireless communication system that includes a plurality of packet data channels, each configured as a time slot on a carrier, the method comprising:
in a Transmission Time Interval, determining whether dynamic scheduling is supported by a mobile station (MS) and identifying a set of pre-assigned packet data channels;
in response to determining that the MS supports dynamic scheduling:
identifying timeslots available for packet data scheduling for the Transmission Time Interval,
determining a new set of packet data channels for potential scheduling to the Temporary Block Flow in the Transmission Time Interval to replace an earlier-assigned set of packet data channels for the Temporary Block Flow, wherein each of the packet data channels in the earlier-assigned set consists of time slots allocated on one of a first carrier and a second carrier, wherein the new set of packet data channels is a subset of the set of the pre-assigned packet data channels and includes a time slot allocated to a third carrier that is different than the first carrier and second carrier;
allocating the new set of packet data channels for the Temporary Block Flow in the Transmission Time Interval; and
scheduling the Temporary Block Flow to the allocated new set of packet data channels.

2. The method according to claim 1, further comprising deciding in the Transmission Time Interval a Temporary Flow Identifier and an Uplink State Flag to address the Temporary Block Flow.

3. The method according to claim 1, further comprising transmitting information of the allocated new set of packet data channels.

4. The method of claim 1, wherein the set of pre-assigned packet data channels includes more than two carriers.

5. The method of claim 1, wherein the allocating step is performed per Transmission Time Interval.

6. A method in a network node for scheduling wireless transmissions between the network node and a mobile station, the method comprising performing, in a Transmission Time Interval:
determining a type of Temporary Block Flow supported by the mobile station;
determining a Temporary Block Flow configuration based on the type of Temporary Block Flow supported by the mobile station;
allocating packet data channels for a Temporary Block Flow based on the Temporary Block Flow configuration; and
transmitting a Temporary Flow Identifier and an Uplink State Flag to inform the mobile station of the Temporary Block Flow configuration, wherein determining the Temporary Block Flow configuration includes:
identifying a set of available packet data channels in the Transmission Time Interval;
evaluating the set of packet data channels for assignment to the Temporary Block Flow in the Transmission Time Interval, wherein the set of packet data channels includes time slots on one carrier for a single carrier mode or two carriers for a dual carrier mode on any carrier within a cell; and
allocating the set of packet data channels for the Temporary Block Flow in the Transmission Time Interval.

7. The method according to claim 6, including informing the mobile station of the new set of packet data channels in a control message.

8. The method according to claim 7, including verifying successful reception in the mobile station of the control message.

9. The method according to claim 8, wherein a pre-assigned Temporary Block Flow configuration is based on pre-defined packet data channels and wherein the Temporary Block Flow scheduling is carried out according to the pre-assigned configuration upon failure to verify successful reception in the mobile station of the control message.

10. The method according to claim 6, including deciding on a Temporary Flow Identifier and an Uplink State Flag to address the Temporary Block Flow.

11. The method of claim 6, wherein the type of the Temporary Block Flow indicates whether the mobile station supports dynamic scheduling of timeslots for the same Temporary Block Flow configuration, or whether the mobile station supports only static scheduling of timeslots for the same Temporary Block Flow configuration.

12. A network node for scheduling a Temporary Block Flow between the network node and a mobile station, the network node comprising a processing circuit being adapted to:
determine a Temporary Block Flow type supported by the mobile station,
determine a Temporary Block Flow configuration based on the Temporary Block Flow type supported by the mobile station, and
allocate packet data channels for the Temporary Block Flow based on the Temporary Block Flow configuration and informing the mobile station of the Temporary Block Flow configuration, and wherein the processing circuit is adapted to determine the Temporary Block Flow configuration by:
identifying a set of available packet data channels in the Transmission Time Interval;
evaluating the set of packet data channels for assignment to the Temporary Block Flow in the Transmission Time Interval, wherein the set of packet data channels includes time slots on one carrier for a single carrier mode or two carriers for a dual carrier mode on any carrier within a cell; and allocating the set of packet data channels for the Temporary Block Flow in the Transmission Time Interval.

13. A mobile station for setting up a Temporary Block Flow with a network node, the mobile station comprising a processing circuit being adapted to:

indicate to the network node whether dynamic scheduling is supported by the mobile station; and receive, from the network node, information in a control message on Temporary Block Flow configuration, the information identifying a new set of packet data channels that replaces an earlier-assigned set of packet data channels for the Temporary Block Flow, wherein each packet data channel in the earlier-assigned set of packet data channels consists of time slots allocated on one of a first carrier and a second carrier, and the new set of packet data channels includes a time slot allocated to a third carrier that is different than the first carrier and the second carrier; and act on the received information and tune to the new set of packet data channels.

* * * * *